Nov. 1, 1960
R. M. NOLLER
2,958,345
STREAKING PIPETTE
Filed Jan. 19, 1959
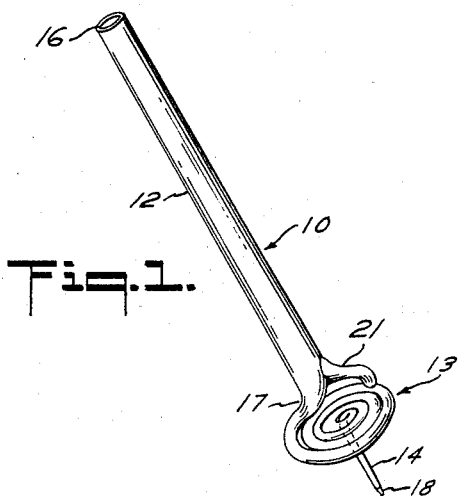
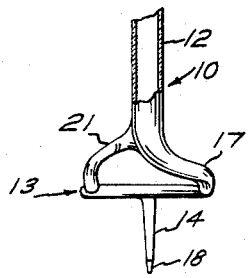
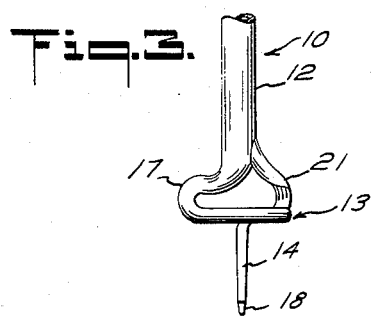
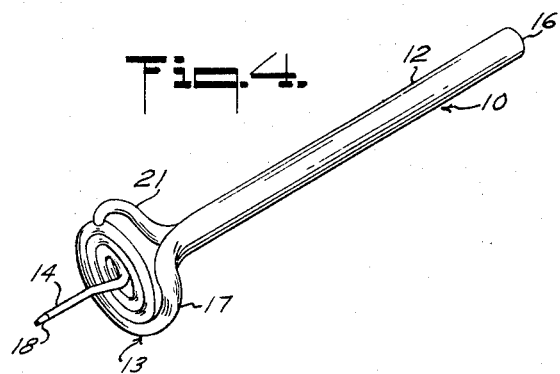
INVENTOR.
ROBERT M. NOLLER
BY
ATTORNEYS United States Patent Office 2,958,345
Patented Nov. 1, 1960

2,958,345

STREAKING PIPETTE

Robert M. Noller, San Pablo, Calif., assignor to Research Specialties Co., Berkeley, Calif., a corporation of California Filed Jan. 19, 1959, Ser. No. 787,495

5 Claims. (Cl. 141—18)

This invention relates to pipettes particularly adapted for use as an implement for applying a liquid through a tip onto a receiving surface.

In some applications of paper chromatography, it becomes desirable to apply a liquid sample as a streak on a piece of filter paper. Pipettes, usually made of glass, are most commonly used for this purpose, but suffer from several disadvantages. First, the volume of liquid which can be held in the tip, from which the liquid flows, without dripping therefrom, is necessarily quite small. Secondly, the rate at which the liquid feeds from the tip during a streaking operation will vary proportionally with the volume of liquid remaining in the pipette.

It is known that advantage can be taken of the capillary rise in a small diameter tube to contain a liquid therein, and no dripping from the tip of the tube will occur if the height of the liquid in the tube is less than the maximum rise which would result from the capillary action. However, the volume of liquid which can be contained in such a dripless tip tube is very limited because of the inherent forces acting to cause capillary rise.

In solving the problem of providing a streaking pipette in which the amount of liquid contained therein would be independent of the height of the capillary rise, it was postulated that if the capillary tube were disposed perpendicularly to the delivery tip at a point below that of the normal capillary rise, then the liquid therein would be held at a constant height with respect to the tip and that the volume of this liquid could be made quite large and that it would not drip from the tip and that the rate of delivery would be independent of the volume remaining in the pipette.

The amount of liquid contained in the tube without dripping occurring from the tip would then be limited only by the length of the tube perpendicular to the delivery tip. The pipette of this invention was fabricated in accordance with this foregoing concept.

It is therefore, the principal object of this invention to provide a streaking pipette in which a large volume of liquid can be contained without dripping from the tip of the pipette.

Another object of this invention is to provide a streaking pipette in which the rate of feeding of liquid from the tip thereof is independent of the volume contained in the tube because the liquid head remains constant.

Still another object is to provide a streaking pipette in which substantially all of the liquid in the tube will feed uniformly through the tip.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perspective view of a streaking pipette embodying this invention.

Figure 2 is a fragmentary front elevation of the tip end of the pipette, shown partially in section.

Figure 3 is a fragmentary rear elevation of the pipette showing the tip end thereof.

Figure 4 is a perspective view similar to Figure 1, but looking from the tip end of the pipette.

To provide a streaking pipette which contains a large volume of liquid and at the same time prevents dripping of the liquid from the tip thereof and also allows the liquid to flow from the tip in a uniform manner until the supply of liquid is substantially exhausted, the pipette of this invention, generally indicated at 10, has been developed, and is preferably made of glass, although other materials suitable for the purpose, such as some of the known plastic materials, may be used.

In broad terms, the pipette 10 includes a straight tube body 12, secondary tubing 13 of reduced bore in communication with the tube 12 and disposed in a plane perpendicular to the axis of the tube 12, and a tip 14 in communication with the tubing 13 generally coaxial with the body 12 but on the opposite side of tubing 13. The bore of the tubing 13 and that of tip 14 is such that the capillary rise of liquid therein will be greater than the distance from the end of the tip to the plane of the tubing so as to achieve the previously discussed objects of this invention.

Referring now to the drawing in more detail, it will be seen that the tube body 12 has a sufficient length to permit ready manual manipulation or clamping to some other mechanism, such as a streaking device. The upper end 16 of the tube is open to permit the application of suction to the tube bore for filling and cleaning operations.

In the interest of minimizing the lateral extent of the pipette, the tubing 13 is formed as a spiral or coil with its general plane normally related to the axis of tube 12 and concentrically disposed thereabout. In order to provide communication between the tube 12 and the tubing 13, the lower end 17 of tube 12 is constricted, bent outwardly and formed contiguously with the outermost spiral of the tubing 13. As to the tip 14, the upper end thereof is integrally joined or formed with the innermost end of the spiral tubing 13, and its lower distal end is ground to a chamfer 18. As will be noted, the tip 14 projects concentrically from the spiral tubing so as to be disposed on the opposite side of the tubing as the tube 12, but is axially aligned with the latter.

Reinforcing means are provided to avoid a mere cantilever support for the tubing, and such means may simply comprise a solid glass rod 21 extending between and connected to a lower end portion of the tube body and the outermost spiral of the tubing 13. Preferably, such rod is positioned in substantial diametrical opposition to the tube portion 17.

From the foregoing description, it will be appreciated that since the entire length of the spiral tubing 13 lies below the normal height of capillary rise in the combination of the tip 14 and tubing, the latter can hold a relatively large supply of liquid therein without dripping. When using the device as a streaking pipette, i.e., streaking a liquid sample as a line on filter paper, as the liquid flows from the tip, the liquid height or head above the tip remains substantially constant, thereby resulting in a desired constant rate of flow, and the amount of liquid that the pipette can contain is limited only by the length of the tubing 13. It should also be noted that since the height of the tubing above the tip is relatively small, the capillary bore of the tubing and the tip can be large enough to preclude the necessity of applying pressure at the open end 16 of the tube body in order to completely empty the pipette.

By way of example only, a pipette may be constructed in accordance with the teachings of this invention, by having the tube bore about 5 mm. in diameter, the capillary tubing bore about 1.5 mm. in diameter, and the tip bore about .30 mm. in diameter, with the height from the end of the tip to the tubing 13 about 11 mm.

What is claimed is:

1. A streaking pipette comprising a tube body having a bore therethrough and open at one end, capillary tubing connected to the other end of said tube body and lying substantially in a single plane at right angles to the axis of the bore in said body, and a tip having a capillary bore therethrough carried at the end of said tubing remote from said connection to said tube body and disposed on the other side of said tubing from said tube body and substantially at right angles to the plane of said tubing, the bore of said tip and said tubing being in communication and of a size such that the capillary rise of liquid therein will be at least equal to the distance between the end of the tip and the plane of said tubing.

2. A pipette as set forth in claim 1 in which the bores of said tube body and said tip are in axial alignment.

3. A pipette comprising a tube body having a bore open at one end, a length of capillary tubing arranged in a spiral coil lying substantially in a single plane, means interconnecting the other end of said bore with said tubing, a tip having a capillary bore therethrough carried by said coiled tubing and in communication therewith, said tip being disposed with its bore generally perpendicular to the plane of said coil, the bore of said tubing and said tip being of a diameter whereby the capillary rise therein will be at least equal to the distance between the end of the tip and the plane of said coil.

4. A pipette as set forth in claim 3 further characterized by reinforcing means interconnecting a portion of said coil and said body at a position spaced from said interconnecting means.

5. A pipette as set forth in claim 3 in which said tube body and said tip are disposed in substantial axial alignment on opposite sides of said coil, with said tube body connected to the outermost end thereof and said tip connected to the innermost end thereof.

References Cited in the file of this patent

UNITED STATES PATENTS

| | | |
|---|---|---|
| 259,182 | Martin | June 6, 1882 |
| 1,869,835 | Alexander et al. | Aug. 2, 1932 |
| 1,964,300 | Perry et al. | June 26, 1934 |